United States Patent Office 3,778,392
Patented Dec. 11, 1973

3,778,392
POLYMERIC STARCH COMPOSITION
John F. Hughes, Montreal, Quebec, Canada, assignor to Cellcor Corporation of Canada Ltd., Montreal, Quebec, Canada
No Drawing. Filed Nov. 23, 1971, Ser. No. 201,312
Int. Cl. C08b 25/02
U.S. Cl. 260—17.3                                    9 Claims

ABSTRACT OF THE DISCLOSURE

A novel polymeric starch composition as well as a process for its production is described. The composition is obtained by
(a) reacting a hydrolysed starch with an amino amide or a diamide, e.g. urea,
(b) reacting the product obtained with an olefinic oxide or dioxide, and
(c) reacting the second product with a carbonyl compound, e.g. formaldehyde, to obtain the final product. This product cures under drying conditions to produce a crosslinked resin composition which shows excellent bonding characteristics to many different materials as well as showing excellent strength properties and water resistance.

BACKGROUND OF THE INVENTION

(1) Field of the invention

This invention relates to a polymeric starch composition as well as to a process for its production.

(2) Description of the prior art

Chemically speaking, starch is a carbohydrate which is synthesized within a plant by combination or polymerization of dextrose according to the general formula $(C_6H_{10}O_5)_n$. If starch is hydrolysed with acid or certain enzymes, it is broken down into its constituent dextrose molecules. Although a starch may be extracted from numerous plants, only a few yield it in commercial quantities, for example: corn (including waxy maize), tapioca, potatoes, sago, wheat, rice, arrowroot and sorghum grain.

The paper and paper product industry is the largest non-food user of starch. Introduced into the pulp, starch adds strength to the formed sheets. Large quantities of starch are also used in surface sizing and in coating high grade magazine papers. In the paper industry, starch has always had the great advantage of being plentiful and inexpensive but has had the disadvantage of not being very water-resistant.

The chemistry of starch is a very old study and, for instance, starch was substituted with urea almost 150 years ago. Starch has also frequently been used in association with substantial quantities of other reagents to produce adhesives, etc. However, the literature shows no indication of anyone having modified starch by addition of small amounts of additional components so as to produce a crosslinkable polymeric composition which cures to form a durable, water-resistant composition showing excellent adhesive properties to both cellulosic products and metal surfaces.

SUMMARY OF THE INVENTION

Thus, according to the present invention a novel polymeric starch composition is produced by reacting a hydrolysed starch with an amino amide or a diamide whereby a substituted starch is obtained. This substituted starch is then reacted with an olefinic oxide or dioxide to further substitute the starch. The composition thus obtained will cure on exposure to air but at a very slow rate. It is, therefore, preferable to include in the composition a linking agent such as a carbonyl compound which greatly accelerates the curing rate.

Either regular starch or hydrolysed starch may be used as the starting material. When regular starch is used, this must be first disintegrated mechanically to increase its solubility or hydrolysed with a mineral acid, such as hydrochloric or sulfuric acid, or by enzymes.

DESCRIPTION OF PREFERRED EMBODIMENTS

As amino amides there can be mentioned such compounds as urea, amino acetamide, etc. Typical of the diamides are those of the di-carboxylic acids such as oxalic, maleic, malic, succinic, etc. Because of its cheapness, ready availability and excellence in the reaction, urea is particularly preferred for this step in the reaction. It is mixed with a catalytic amount of mineral acid solution and then hydrolysed starch is introduced to the reaction vessel. When urea is used, an amount of less than about 3% by weight based on the starch is usually quite sufficient although it is quite possible to use considerably more, e.g. up to 15% or more of the urea. However, such large amounts serve no practical purpose in the reaction.

Reaction of the diamide substituted starch with the olefinic oxide or dioxide is preferably conducted at an acid pH. The reaction proceeds most efficiently at a pH of 3 or less. It is possible to conduct the reaction at about neutral pH but the reaction rate tends to be quite slow. When the olefinic oxide substitution is carried out at an acid pH, it is preferable to neutralize the solution after the substitution. This can conveniently be done by addition of ammonia.

As olefinic oxide there can be used, for example, ethylene oxide, propylene oxide, epi-chlorohydrin, etc. and propylene oxide has been found to be particularly desirable. Usually less than about 10% of propylene oxide is added, although more than this amount could be used if desired. The olefinic oxide acts as a chain opener in the substituted starch molecule and also functions as a building block in the molecule to provide wet strength in the final resin composition.

The composition thus obtained represents the basic composition of the invention and this material will, when allowed to dry, cure into a durable, water-resistant resin composition. However, the curing rate is extremely low so that it would not be very satisfactory for a commercial operation. It is, therefore, advantageous to include in the composition a crosslinking agent, such as a carbonyl compound. Typical of such compound is an aldehyde or ketone and because of low cost, ready availabilty and reactivity, formaldehyde has been found to be particularly useful. Normally up to about 5% of formaldehyde is quite adequate although the presence of an excess of the formaldehyde appears to create no difficulties.

A typical composition produced in the above manner will contain about 40 to 80% solids and may have a viscosity of about 400 to 700 cps. Such a composition can be stored for considerable periods of time in closed containers and when applied to a substrate such as paper or metal, forms a superior bond thereto as well as forming an excellent coating material. It is believed that particularly in the case where the composition is applied to a cellulosic substrate, such as paper, textiles or wood, during the curing stage the starch-base coating composition crosslinks directly with the cellulose molecules, thereby forming a unique bond.

The composition finds use for coating high quality papers, mixing into wet pulp during paper recycling operations to increase the strength of the final paper, for coating of metal surfaces, etc. It can also be used as a molding composition to mold containers, etc. and has the particularly important advantage over the vinyl polymers, olefinic polymers, polyesters, etc. that this material is biodegradeable.

Starch being a naturally occurring material, is complex and variable in composition. It is, therefore, very difficult to determine precisely what chemical reactions take place during the process of this invention. However, it is believed that the reaction sequence may be as follows:

(a) Acid hydrolysis of starch

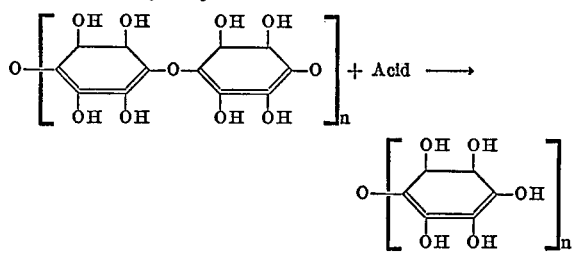

(b) Urea substitution under acid conditions

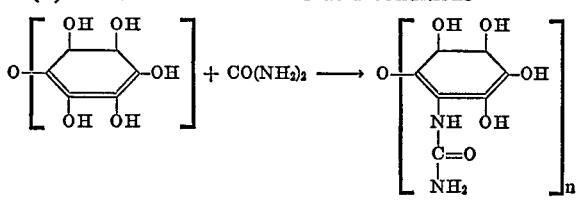

(c) Addition of propylene oxide

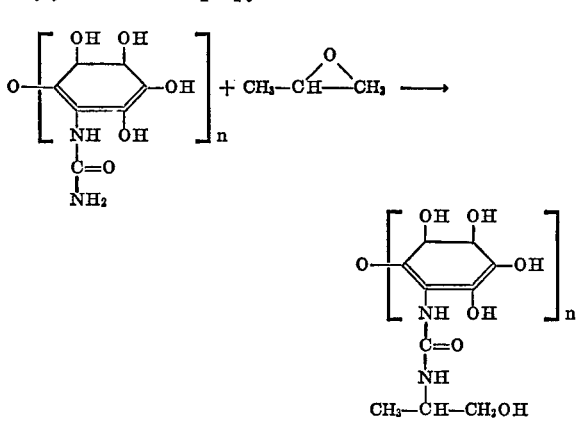

(d) Addition of formaldehyde

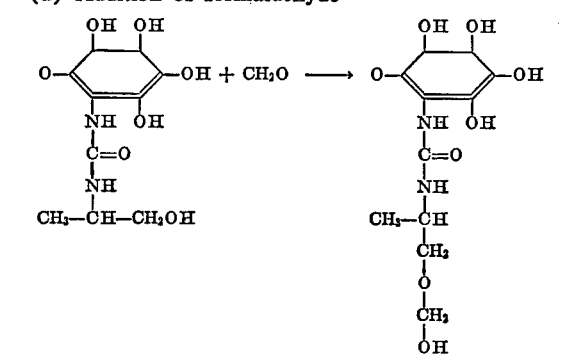

Certain preferred embodiments of the invention are illustrated by the following non-limiting examples:

EXAMPLE 1

A hydrolyzed waxy maize starch available from Corn Products Corporation under the trade designation P-908 was dissolved in a 0.1 normal acid solution containing 2.5% by weight of urea based on the amount of starch to form a solution containing 60% by weight solids. The mixture was heated to 190° F. for 2 minutes with stirring. It was then cooled to 160° F. and 5% by weight of propylene oxide was added with stirring. Finally, 8% by weight of a standard 32% formaldehyde solution was added to complete the curable composition.

The composition was then stored in a sealed container until it was used.

EXAMPLE 2

A commercial wheat starch was mixed together with 0.5 N HCl and 2.5% by weight of urea to form a solution containing 40% by weight of solids. The solution obtained was filtered to remove residues and then to the solution was added propylene oxide and ammonia in a ratio of 20 parts propylene oxide to 80 parts ammonia. This was added until a pH of 8 was achieved, about 10% by weight being required. Finally, 10% by weight of formaldehyde was added to complete the composition.

The curable composition obtained was then stored in a sealed container until it was used.

EXAMPLE 3

A commercial potato starch was mixed with 0.5 N $H_2SO_4$ for about 5 minutes at 240° F. to produce a hydrolyzed starch solution containing 60% by weight of solids and having a dextrin equivalent of 5. With this was mixed 2.5% by weight urea. To this was added 2% by weight of propylene oxide and sufficient ammonia to raise the pH to 8. Thereafter, about 10% by weight of formaldehyde was added.

The addition of the formaldehyde caused the pH to drop to about 3 and caustic was added to raise the pH to about 8–9. At this pH the composition remains stable during storage. However, when it is to be used, the pH must be adjusted down to below 5.

EXAMPLE 4

A series of tests were carried out to determine wet and dry tensile strengths of kraft paper treated with a resin solution produced according to the process of Example 1. This solution contained about 50% solids and had a viscosity of about 600 cps. The kraft paper was unsized and the ream weight (500 sheets, 24 x 36) was approximately 52 pounds.

Sheets were cut to 8½ to 11 inches in size. These were weighed in the air-dry condition and individually dipped in solutions of resin for 1½ to 2 seconds and then passed through a pair of rollers. The sheets were dried at 105° C. for 30 minutes, then allowed to condition in room atmosphere. Strips were cut for the tensile tests lengthwise with the direction of the paper. Strips for dry tensile strength tests were conditioned at 50% RH before testing. Wet tensile strength tests in this series were determined after 3 minutes immersion in distilled water. Four sheets were prepared and tested at each concentration of resin pickup.

The results are shown in the following Table A. Each figure reported in this table is the average of five determinations.

TABLE A

| Concentration of resin solution used [1] | Pick-up of dry resin, grams | Dry resin pick-up as percent of wt. of air-dry sheet | Dry tensile strength, pounds per inch | Wet tensile strength per inch |
|---|---|---|---|---|
| 0.59 | 0.056 | 1.11 | 27.3 | 1 lb., 11 oz. |
| .59 | .058 | 1.13 | 34.1 | 1 lb., 1 oz. |
| .59 | .060 | 1.16 | 36.6 | 2 lb., 2 oz. |
| .59 | .057 | 1.11 | 35.1 | 2 lb., 0 oz. |
| 1.87 | .161 | 3.08 | 35.2 | 2 lb., 2 oz. |
| 1.87 | .162 | 3.14 | 34.6 | 2 lb., 6 oz. |
| 1.87 | .157 | 3.08 | 32.4 | 2 lb., 4 oz. |
| 1.87 | .159 | 3.08 | 28.7 | 2 lb., 2 oz. |
| 3.08 | .263 | 5.11 | 35.4 | 2 lb., 9 oz. |
| 3.08 | .260 | 5.10 | 35.4 | 2 lb., 5 oz. |
| 3.08 | .258 | 5.14 | 31.3 | 2 lb., 8 oz. |
| 3.08 | .263 | 5.20 | 31.4 | 2 lb., 7 oz. |
| 4.05 | .328 | 6.56 | 31.0 | 2 lb., 6 oz. |
| 4.05 | .339 | 6.58 | 39.5 | 2 lb., 15 oz. |
| 4.05 | .344 | 6.77 | 37.7 | 3 lb., 2 oz. |
| 4.05 | .345 | 6.83 | 39.5 | 3 lb., 3 oz. |

[1] Grams dry resin per 100 gram solution.

Sheets containing approximately 5% pickup of dry resin were prepared and used for this test. Strips with a wet tensile strength were cut and immersed in distilled water for varying lengths of time before breaking the strip. The following results were obtained: Average pick-up of dry resin based on the air-dry weight of the paper—5.11%.

| Length of time of immersion in water: | Wet tensile strength per inch |
|---|---|
| 2 minutes | 2 lbs. 6 oz. |
| 6 minutes | 2 lbs. 8 oz. |
| 18 minutes | 2 lbs. 7 oz. |
| 60 minutes | 2 lbs. 6 oz. |
| 24 hours | 2 lbs. 1 oz. |

The wet tensile strength was practically unchanged for immersion in water ranging from 2 to 60 minutes. An immersion of 24 hours resulted in a slight decrease in wet strength.

I claim:
1. A process for producing a curable polymeric composition which comprises:
 (a) reacting starch with an amide selected from an amino amide and diamide in an acid medium, and
 (b) reacting the product of part (a) with an olefinic compound selected from olefinic oxides and dioxides under alkaline conditions.
2. A process according to claim 1 wherein the amide is urea.
3. A process according to claim 1 wherein the olefinic compound is propylene oxide.
4. A process according to claim 1 wherein the product of part (b) is reacted with a carbonyl compound.
5. A process according to claim 4 wherein the carbonyl compound is selected from aldehydes and ketones.
6. A process according to claim 4 wherein the carbonyl compound is formaldehyde.
7. A process according to claim 2 wherein up to 3% by weight of urea is added based on the starch.
8. A process according to claim 3 wherein up to 10% of propylene oxide is added based on the starch.
9. A process according to claim 2 wherein the urea is reacted with the starch at a pH below 3.

References Cited
UNITED STATES PATENTS

| | | | |
|---|---|---|---|
| 2,725,362 | 11/1955 | Gaver et al. | 260—9 |
| 3,277,213 | 10/1966 | Fuzesi | 260—233.3 R |
| 3,422,087 | 1/1969 | Caesar | 260—233.3 R |
| 3,666,751 | 5/1972 | Jarowenko | 260—233.3 R |
| 3,674,725 | 7/1972 | Aitken | 260—9 |

WILLIAM H. SHORT, Primary Examiner
E. WOODBERRY, Assistant Examiner

U.S. Cl. X.R.

106—210; 117—127, 156, 165; 162—167, 175; 260—9, 233.3 R, 233.5